United States Patent [19]

Taguchi

[11] Patent Number: 4,723,294

[45] Date of Patent: Feb. 2, 1988

[54] NOISE CANCELING SYSTEM

[75] Inventor: Tetsu Taguchi, Tokyo, Japan

[73] Assignee: NEC Corporation, Tokyo, Japan

[21] Appl. No.: 938,916

[22] Filed: Dec. 8, 1986

[30] Foreign Application Priority Data

Dec. 6, 1985 [JP] Japan ............................... 60-275444

[51] Int. Cl.[4] ............................................ H04B 15/00

[52] U.S. Cl. ...................................................... 381/94

[58] Field of Search ........................ 381/71, 94, 46, 47; 379/202, 206

[56] References Cited

U.S. PATENT DOCUMENTS 4,008,439 2/1977 Schroeder ............................ 381/94

4,536,887 8/1985 Kaneda et al. ........................ 381/94

4,630,304 12/1986 Borth et al. .......................... 381/94

4,658,426 4/1987 Chabries et al. ...................... 381/94

*Primary Examiner*—Forester W. Isen

*Attorney, Agent, or Firm*—Sughrue, Mion, Zinn, Macpeak & Seas

[57] ABSTRACT

Under the condition where a plurality of background noise sources exists, there are arranged a first receiver, primarily receiving desired voice, and a plurality of second receivers each primarily receiving noise from a corresponding noise source. Filter coefficients of equivalent noise-producing filters, each having a frequency transmission characteristic equivalent to that of transmission path from its corresponding noise source to the first receiver, are estimated based upon mutual-correlation coefficients among the outputs of the first and second receivers and auto-correlation coefficients of the respective outputs of the second receivers. The noise signals from the equivalent noise-producing filters are subtracted from the output of the first receiver, thereby canceling the background noise. The filter coefficients estimation may be performed by using a maximum of the mutual-correlation coefficients between the outputs of the first receiver and the respective second receivers.

10 Claims, 6 Drawing Figures

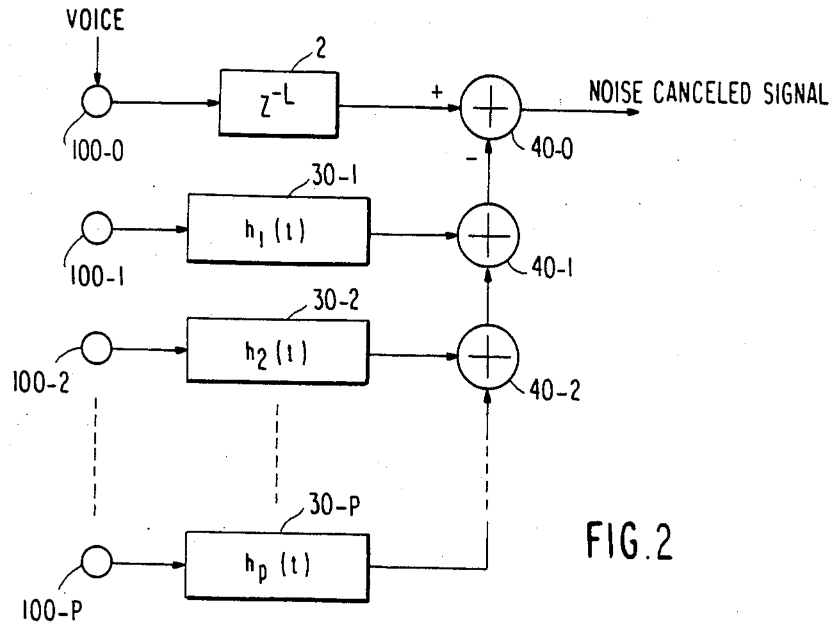
FIG. 2
FIG. 3
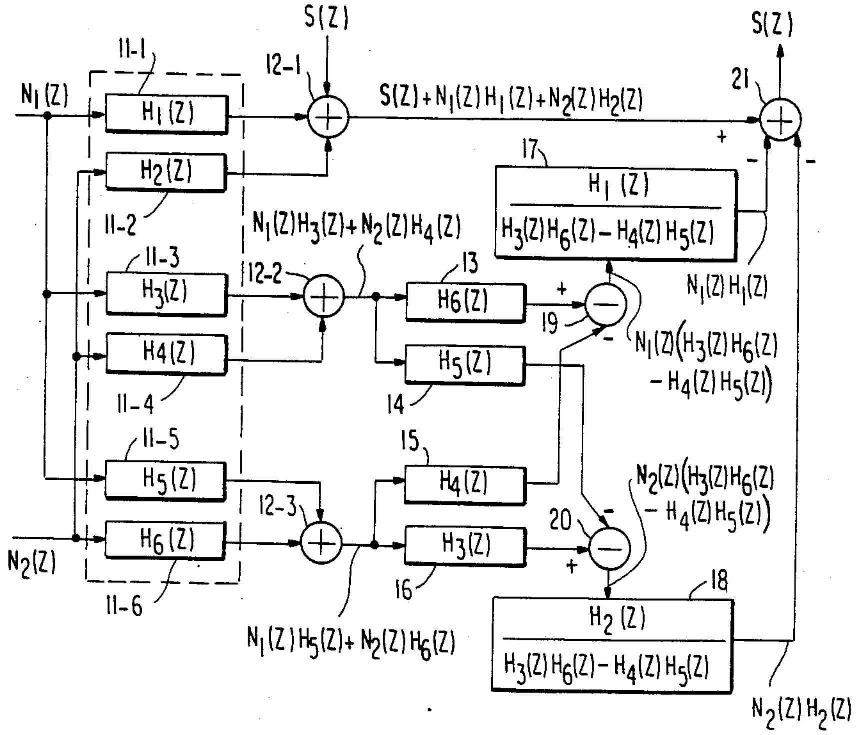

NOISE CANCELING SYSTEM

Cross Reference to Related Application Ser. No. 925,060, filed Oct. 30, 1986.

BACKGROUND OF THE INVENTION

1. Field of the Invention

The present invention relates to a noise canceling system, and more particularly to a noise canceling system which cancels a plurality of background noises that infiltrate into a voice receiver through different transmission paths.

2. Description of the Prior Art

The common noise canceling system for removing (canceling) from the output of the voice receiver noises generated from a plurality of noise sources and received by the voice receiver is such that the frequency transmission characteristics such as impulse response and transmission functions of noise transmission paths from the noise sources to the voice receiver, are estimated, and the noises are produced via the estimated frequency transmission characteristics, linearly added up together, and are subtracted from the output of the voice signal receiver so as to be canceled.

According to the above-mentioned conventional noise canceling system, however, the amount of operation becomes essentially very great.

That is, in the above typical noise canceling system, frequency transmission characteristics of noise transmission paths from noise sources to a voice receiver are estimated by some means, filters such as transversal digital filters having transmission functions that offer the above frequency transmission characteristics are constituted as equivalent noise-producing filters, and noises generated by the noise sources are produced via the equivalent noise-producing filters, added up together linearly, and are subtracted as an equivalent superposed noise of the plurality of noise sources from the output of the voice receiver so as to be canceled. Therefore, how efficiently to estimate the coefficients of transversal filters that constitute an equivalent noise-producing filter, is very important for preventing the amount of processing from greatly increasing.

The filter coefficient of such an equivalent noise-producing filter is estimated as described below. That is, when there exists a single noise source, the filter coefficient which minimizes the electric power of noise-canceled residual waves after the output of the transversal filter is subtracted from the output of the voice receiver, is determined by widely known methods such as solving an inverse matrix of a row number and a column number determined by the tap number of the filter or searching relying upon a maximum inclination method. Where there exist a plurality of noise sources, the coefficients of a plurality of equivalent noise-producing filters must be determined by taking the effects among the noise sources into consideration. Even when there exists only one noise source, however, the amount of processing and operation becomes essentially very great. The amount of processing and operation becomes tremendously great when a plurality of noise sources have to be treated by giving attention to the effects among the noise sources.

According to another method for estimating the filter coefficient of the equivalent noise-producing filter, the filter coefficient which minimizes the electric power of noise-canceled residual waves, is set over a considerably long period of observation time by forming an automatic control loop and by effecting the adaptive control. However, since the observation time is considerably long, the processing response tends to be considerably delayed even when there exists only one noise source. In particular, this method exhibits poor follow-up performance for the noise that changes with time.

SUMMARY OF THE INVENTION

An object of the present invention is, therefore, to provide a noise canceling system capable of canceling noises generated from a plurality of noise sources.

Another object of the present invention is to provide a noise canceling system capable of remarkably reducing the calculation amount for estimating the filter coefficients.

According to the present invention, under the condition where a plurality of background noise sources exist, there are arranged a first receiver, primarily receiving desired voice, and a plurality of second receivers each primarily receiving noise from a corresponding noise source. Filter coefficient of equivalent noise-producing filters each having a frequency transmission characteristics equivalent to that of transmission path from its corresponding noise source to the first receiver are estimated based upon mutual-correlation coefficients among the outputs of the first and second receivers and auto-correlation coefficients of the respective outputs of the second receivers. The noise signals from the equivalent noise-producing filters are subtracted from the output of the first receiver, thereby canceling the background noise. The filter coefficients may be estimated by using a maximum value of the mutual-correlation coefficients between the outputs of the first receiver and the respective second receivers.

Other objects and features will be clarified by the following explanation with reference to the attached drawings.

BRIEF DESCRIPTION OF THE DRAWINGS

FIG. 2 is a diagram which illustrates a fundamental principle for canceling the noise according to the embodiment of FIG. 1;

FIG. 3 is a diagram illustrating the cancelation of noise utilizing the estimated impulse responses of the noise transmission paths;

PREFERRED EMBODIMENTS OF THE INVENTION

Figure 1:
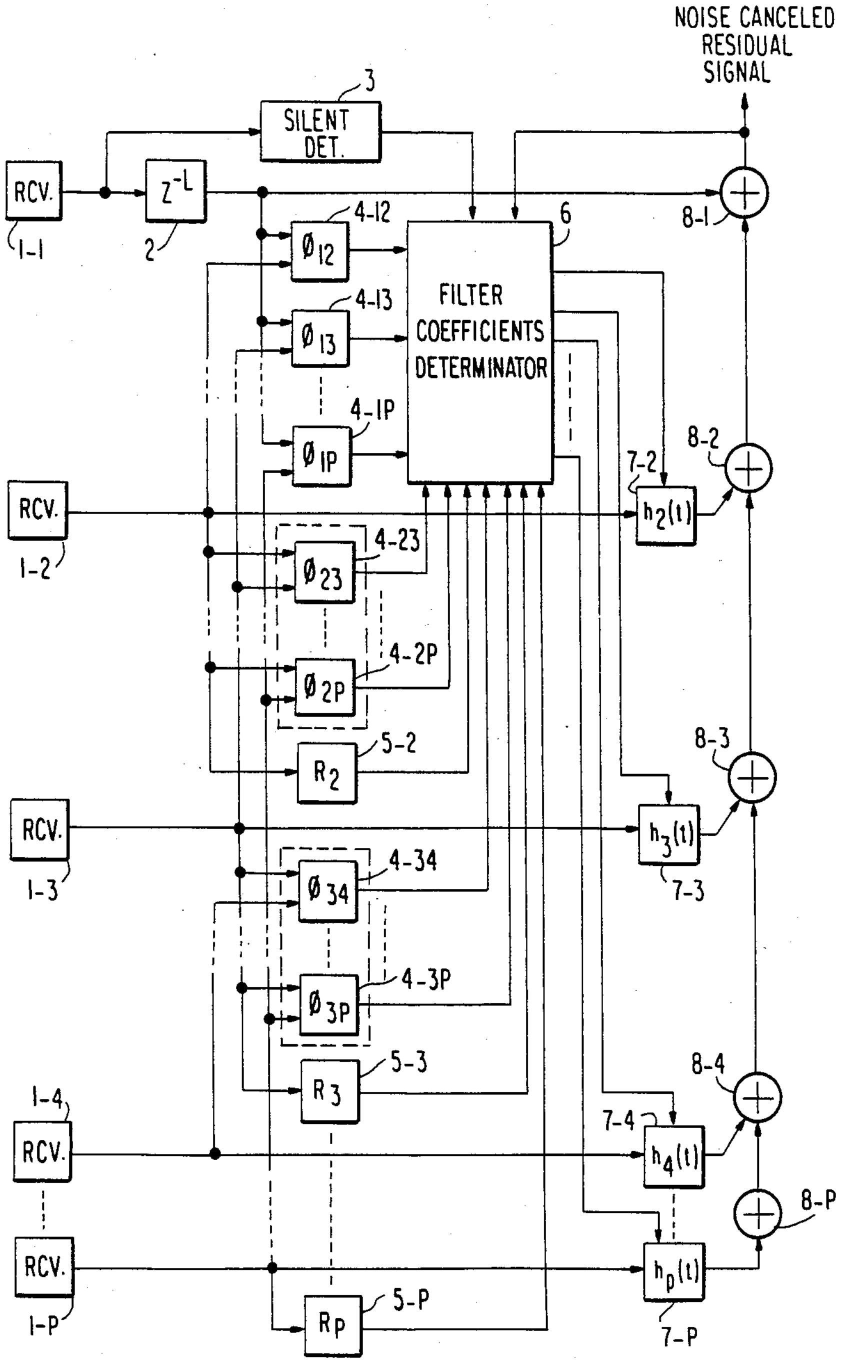
FIG. 1 is a block diagram which illustrates a first embodiment and a second embodiment of the present invention in combination.

FIG. 1 is a block diagram which explains first and second embodiments according to the present invention, wherein portions indicated by dotted lines are blocks that are related to the second embodiment.

The first embodiment shown in FIG. 1 comprises sound receivers of a number P, i.e., 1-1, 1-2, 1-3, 1-4, - - - , 1-P, a delay circuit 2 formed by connecting L unit delay elements in cascade, a silence detector 3, mutual-correlation coefficient calculators 4-12, 4-13, - - - , 4-1P, auto-correlation coefficient calculators 5-2, 5-3, - - - , 5-P, a coefficient determining unit 6, equivalent noise-producing filters 7-2, 7-3, 7-4, - - - , 7-P, and adders 8-1, 8-2, 8-3, 8-4, - - - , 8-P.

The sound receiver 1-1 chiefly receives voice signals together with noise generated from a plurality of noise sources. The receivers 1-2, 1-3, 1-4, - - - , 1-P of a number (P-1) chiefly trap noises generated from a plurality (P-1) of noise sources. If the frequency transmission characteristics such as impulse response characteristics are found for each of the transmission paths from the plurality of noise sources to the sound receiver 1-1, the noise produced via the impulse response characteristics can be subtracted from the ouput of the sound receiver 1-1 during silence to cancel the noise. This is based upon the fact that the output of the sound receiver 1-1 during silence, i.e., the output of mixed noise from the plurality of noise sources can be regarded to be equal to the superposition of linear combinations of the noises.

The impulse response can be easily constituted as a transversal filter having a transfer function that exhibits the impulse response characteristics. Even in this embodiment, a desired impulse response is obtained in the form of a transversal filter.

FIG. 2 is a diagram of a fundamental principle for canceling noise according to the embodiment of FIG. 1.

A voice signal and an undesired noise signal are superposed and added up together via an input terminal 100-1, and are supplied to a delay circuit 2.

The delay circuit 2 consists of unit delay elements that are combined in L stages, and imparts a predetermined time delay to the inputs that are introduced via an input terminal 100-0. By taking into consideration the relationships among the sound receiver that sends voice signals inclusive of noise to the input terminal 100-0 and a group a sound receivers that send noises to input terminals 100-1 to 100-P (P=2, 3, 4, - - - ), the delay time is so selected that the addition in an adder 40-1 maintains nearly the same phase with respect to the same noise.

Equivalent noise-producing filters 30-1 to 30-P have impulse responses $h_1(t)$ to $h_P(t)$ of noise transmission paths between each of P noise sources and the sound receiver that traps voice signals. Noises generated by P noise sources are received by P equivalent noise-producing filters, superposed and added up together through adders 40-1, 40-2, - - - , reversed for their polarities, and are added to the output of the delay circuit 2 through an adder 40-0. That is, the noises are subtracted from the output of the delay circuit 2 so as to be canceled. That is, the fundamental requirement for canceling the noise is how efficiently to determine the impulse responses $h_1(t)$ to $h_P(t)$ of the transmission paths for the noises generated from the noise sources.

Described below in detail is a fundamental method of canceling the noise utilizing the impulse responses of the noise transmission paths.

FIG. 3 is a diagram explaining the cancelation of noise utilizing the estimated impulse responses of the noise transmission paths. FIG. 3 shows the case where the noises are to be canceled from the two noise sources.

Symbols $N_1(Z)$ and $N_2(Z)$ denote noises by Z-conversion notation produced by two noise sources, an adder 12-1 represents a function of the sound receiver which receives a voice signal S(Z), and adders 12-2 and 12-3 represent functions of sound receivers that chiefly trap noises $N_1(Z)$ and $N_2(Z)$.

To the adder 12-1 are input the voice signal S(Z) as well as undesired signals consisting of noises $N_1(Z)$ and $N_2(Z)$, and transmission paths 11-1 and 11-2 thereof are denoted by transfer functions $H_1(Z)$ and $H_2(Z)$. An adder 12-2 chiefly receives noise $N_1(Z)$. To the adder 12-2 is also input an undesired signal consisting of noise $N_2(Z)$. Transmission paths 11-3 and 11-4 thereof are denoted by transfer functions $H_3(Z)$ and $H_4(Z)$. Further, an adder 12-3 chiefly receives noise $N_2(Z)$ as well as undesired noise $N_1(Z)$. Transmission paths 11-6 and 11-5 thereof are denoted by transfer functions $H_6(Z)$ and $H_5(Z)$. If the transfer functions surrounded by a dotted line are known, there are obtained the following adder outputs:

$$S(Z)+N_1(Z)H_1(Z)+N_2(Z)H_2(Z) \quad (1)$$

$$N_1(Z)H_3(Z)+N_2(Z)H_4(Z) \quad (2)$$

$$N_1(Z)H_5(Z)+N_2(Z)H_6(Z) \quad (3)$$

The above equations (1) to (3) represent outputs of the adders 12-1 to 12-3.

The desired voice signals S(Z) only can be obtained if undesired noise $N_1(Z)H_1(Z)$ input via the transfer function $H_1(Z)$ and undesired noise $N_2(Z)H_2(Z)$ input via the transfer function $H_2(Z)$ are subtracted from the output of the adder 12-1 represented by the equation (1). Namely, the output of the adder 12-2 represented by the equation (2) and the output of the adder 12-3 represented by the equation (3) are converted into $N_1(Z)H_1(Z)$ and $N_2(Z)H_2(Z)$, respectively, to reverse the signs, and are added to the output of the adder 12-1 represented by the equation (1). In effect, S(Z) only is left by the subtraction. The above-mentioned conversion can be applied to the outputs of the adders 12-2 and 12-3 in various ways. In any case, the operational method can be fundamentally put into practice by the combination of folding multiplication of the transfer functions and the addition as well as subtraction.

In the case of FIG. 3, the output of the adder 12-2 is once supplied to equivalent noise-producing filters 13 and 14 having transfer functions $H_6(Z)$ and $H_5(Z)$, and the output of the adder 12-3 is supplied to equivalent noise-producing filters 15 and 16 having transfer functions $H_4(Z)$ and $H_3(Z)$. The output of the equivalent noise-producing filter 15 is subtracted by a subtracter 19 from the output of the equivalent noise-producing filter 13, and the output of the equivalent noise-producing filter 14 is subtracted by a subtracter 20 from the output of the equivalent noise-producing filter 16. The outputs of these subtracters are given by the following equations (4) and (5):

$$N_1(Z)(H_3(Z)H_6(Z)-H_4(Z)H_5(Z)) \quad (4)$$

$$N_2(Z)(H_3(Z)H_6(Z)-H_4(Z)H_5(Z)) \quad (5)$$

The noises $N_1(Z)$ and $N_2(Z)$ converted into the forms of folding multiplications relative to the transfer functions indicated by common parentheses, are converted into equivalent noises $N_1(Z)H_1(Z)$ and $N_2(Z)H_2(Z)$ through equivalent noise-producing filters 17 and 18 having transfer functions as given by the following equations (6) and (7):

$$\frac{H_1(Z)}{H_3(Z)H_6(Z) - H_4(Z)H_5(Z)} \quad (6)$$

$$\frac{H_2(Z)}{H_3(Z)H_6(Z) - H_4(Z)H_5(Z)} \quad (7)$$

An adder 21 obtains the desired output S(Z) from which the noise is erased by adding up together the outputs of the equivalent noise-producing filters 17 and 18 while inverting their signs.

By combining the transfer functions $H_1(Z)$ to $H_6(Z)$ as described above, there is produced equivalent noise from which are removed the effects among the noises. The equivalent noise is then subtracted from the output of the voice signal receiver to fundamentally cancel the noise. There can be contrived a variety of other methods to utilize the transfer functions for canceling noises. What is important is how to use the transfer functions of the equivalent noise-producing filters in order to simplify the contents of processing.

Here, the transfer functions $H_1(Z)$ to $H_6(Z)$ that will be used in the aforementioned noise canceling means are all unknown values and must, hence, be estimated before being used. Further, the above-mentioned embodiment has dealt with the case where there existed two noise sources. However, the processing can be effected in the same manner even when there exist two or more noise sources.

Transfer functions of the noise transmission paths can fundamentally be estimated as described below. To simplify the description, it is now presumed that there exists only one noise source.

Figure 5:
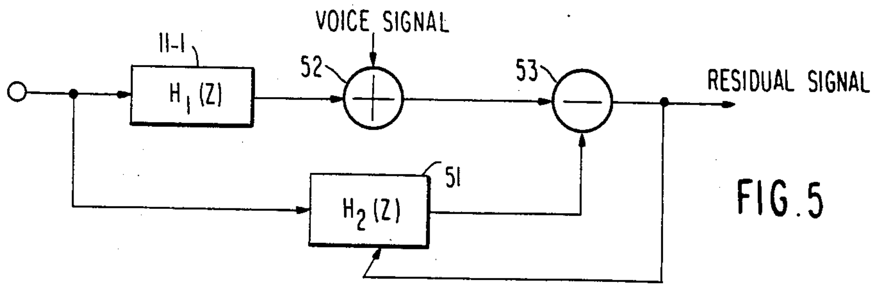
FIG. 5 is a diagram showing the fundamental method of estimating the transfer function of the noise transmission path.

FIG. 5 is a diagram showing a fundamental method to estimate the transfer function of a noise transmission path.

The noise generated by a noise source is superposed on and added to the voice signal in an undesired form. This is depicted by an adder 52. The output is supplied to a subtracter 53. On the other hand, an equivalent noise-producing filter 51 is constituted as a transversal filter which traps the noise generated by the noise source and supplies an output thereof to the subtracter 53. Under this condition, the output of the equivalent noise-producing filter 51 is supplied as an argument to the subtracter 53, and the filter coefficient of the equivalent noise-producing filter 51 is so selected that the output of the subtracter 53 becomes minimum when the voice signal is zero, i.e., so that the electric power of the noise-canceled residual waves becomes minimum. Then, the transfer function $H_2(Z)$ almost converges into $H_1(Z)$. As mentioned earlier, the filter coefficient is estimated by arithmetic operation such as solving the inverse matrix having row and column numbers determined by the tap number of the equivalent noise-producing filter 51, or searching based upon the maximum inclination method, or by the adaptive control using an automatic control loop which minimizes the electric power of noise-canceled residual waves. Even when there exists only one noise source, the amount of operation becomes very great to determine the transfer function of the transmission path, or the response time becomes so long that follow-up performance is deteriorated for the noise that change with the lapse of time. When there exist a plurality of noise sources, therefore, the amount of operation becomes tremendously great, and the follow-up performance is inevitably deteriorated greatly.

Figure 6:
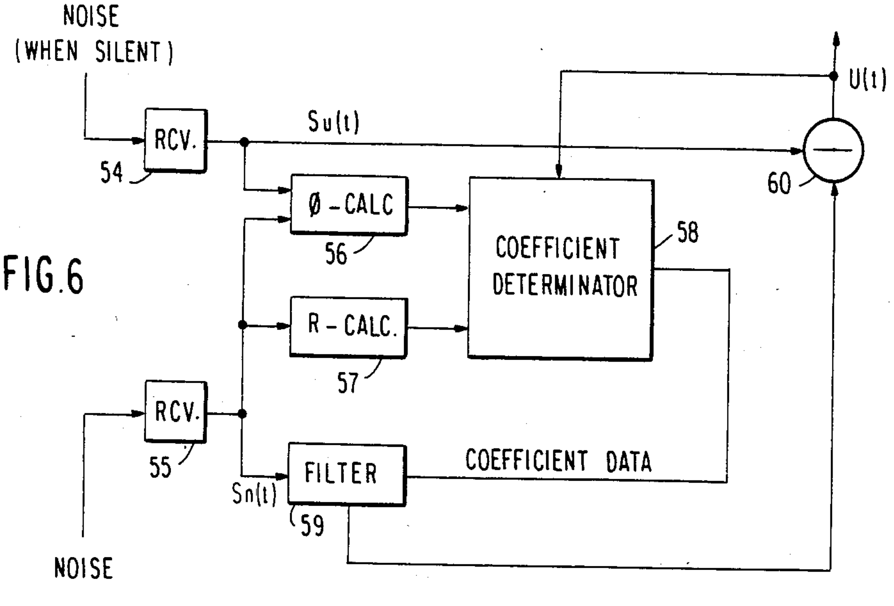
FIG. 6 is a diagram illustrating the efficient estimation of coefficients of the equivalent noise-producing filter.

To solve this problem, there can be contrived an efficient method as described below. FIG. 6 is a diagram which illustrates the fundamental processing for efficiently estimating the filter coefficient of the equivalent noise-producing filter. FIG. 6 deals with the case where there exists only one noise source.

When the voice signal is silent, a sound receiver 54 receives noise generated by the noise source in an undesired form. A waveform that is detected is denoted by $S_\mu(t)$. A sound receiver 55 also receives noise generated by the noise source. A waveform thereof detected is denoted by $S_n(t)$. Since $S_\mu(t)$ can be regarded to be a linear combination of $S_n(t)$, the noise can be canceled by the subtraction between these two noises.

Here, it is presumed that the filter coefficient of the equivalent noise-producing filter 59 formed as a transversal filter is set at a tap position that is delayed by one, and other coefficients are all zero. In this case, the noise-canceled residual waveform U(t) produced by a subtracter 60 is given by the following equation (8):

$$U(t)=S_\mu(t)-aS_n(t-\tau) \quad (8)$$

If the number of observation sections is N, and the electric power U(t) of the equation (8) is E, then E is given by the following equation (9):

$$E = \sum_{n=1}^{N} U^2(t) = \sum_{n=1}^{N} \{S_\mu^2(t) - 2aS_\mu(t) \cdot S_n(t-\tau) + a^2S_n^2(t-\tau)\} \quad (9)$$

From the equation (9), a coefficient a that minimizes the electric power E at the tap $\tau$ is obtained to make the following equation (10) zero, i.e., $$\frac{aE}{a^a} = -2\sum_{t=1}^{N} S_\mu(t) \cdot S_n(t-\tau) + 2a\sum_{t=1}^{N} S_n^2(t-\tau) \quad (10)$$

That is, the coefficient a is found from the following equation (11):

$$a = \frac{\sum_{t=1}^{N} S_\mu(t) \cdot S_n(t-\tau)}{\sum_{t=1}^{N} S_n^2(t-\tau)} \quad (11)$$

A numerator on the right side of the equation (11) represents a mutual-correlation coefficient $\phi(\tau)$ of $S_\mu$ and $S_n$ at the tap $\tau$, and the denominator denotes an auto-correlation coefficient R(o) of $S_n$ at the tap zero. Using these symbols, the equation (11) can be expressed as the following equation (12):

$$a=\phi(\tau)/R(o) \quad (12)$$

If the coefficient a is determined, U(t) is determined from the equation (8). The thus obtained U(t) is regarded to be $S_\mu(t)$, and a filter coefficient which minimizes the noise-canceled residual waveform is estimated. The above operation is repeated until the noise-canceled residual waveform becomes smaller than a predetermined level. This method of repetitive processing helps greatly reduce the amount of operation required for estimating the filter coefficient compared with the method described with reference to FIG. 5.

However, the present invention effects the following processing in order to further reduce the required amount of operation.

If now a mutual-correlation coefficient between U(t) and $S_n(t)$ is denoted by $\phi_1(v)$, then $\phi_1(v)$ is given by the following equation (13):

$$\phi_1(\nu) = \sum_{t=1}^{N} U(t)S_n(t+\nu) = \sum_{t=1}^{N} \{S_\mu(t) - aS_n(t-\tau)\}S_n(t+\nu) = \sum_{t=1}^{N} S_\mu(t)S_n(t+\nu) - \sum_{t=1}^{N} aS_n(t-\tau)S_n(t+\nu) = \phi(\nu) - aR(\tau+\nu) \quad (13)$$

That is, when there exists only one noise source, a mutual-correlation coefficient $\phi(v)$ between $S_\mu$ and $S_n$ at a tap v is once determined, and is corrected by an auto-correlation coefficient sequence aR $(\tau - v)$ which includes a, in order to successively estimate $\phi(v)$ for each of maximum values. A filter coefficient is obtained if the mutual-correlation coefficient $\phi_1(v)$ is divided by R(o) and is normalized. The correcting processing is thus effected successively to easily determine the filter coefficients. A mutual-correlation coefficient calculator 56, a auto-correlation coefficient calculator 57 and a coefficient determining unit 58 of FIG. 6 work to offer necessary coefficients and to determine filter coefficients relying upon the above-mentioned idea for processing.

In the foregoing was described the case where there was no time delay between the noise entering into the sound receiver which mainly traps the voice signals and the noise entering into the sound receiver which mainly traps the noise. Even when there exists a time difference, however, the invention can be easily put into practice by imparting a corresponding time delay to the noise that is in advance.

In the above-mentioned embodiments of FIGS. 5 and 6, there existed only one noise source. When there exist a plurality of noise sources, however, effects among noises become a problem, and correction must be effected by taking this fact into consideration. Described below are the contents of correction when there are a plurality of, for example, two noise sources as shown in FIG. 3.

A noise that has entered into the sound receiver which traps voice signals and is detected, is denoted by $S_\mu(t)$ and noises that are detected after having entered into the sound receivers that trap noises from the first and second noise sources are denoted by $S_{n1}(t)$ and $S_{n2}(t)$, respectively. It is now presumed that a filter coefficient of the equivalent noise-producing filter of the type of transversal filter has been determined at a tap $\tau$ only, the equivalent noise-producing filter having a transfer function that exhibits an impulse response to a transmission path that is to be estimated for the second noise source. In this case, mutual-correlation coefficients that have to be taken into consideration include $S_\mu(t)$, $S_{n1}(t)$ and $S_{n2}(t)$ as well as mutual-correlation coefficients of a combination of $S_{n1}(t)$ and $S_{n2}(t)$. The auto-correlation coefficient $S_{n1}(t)$ and $S_{n2}(t)$ also affect the system. This is explained below. That is, the filter coefficient of the equivalent noise-producing filter for the second noise source has been set only with respect to the tap $\tau$. In this case, a noise-canceled residual waveform U(t) is given by the following equation (14):

$$U(t) = S_\mu(t) - aS_{n2}(t-\tau) \quad (14)$$

If U(t) is regarded to be an input noise of the second time instead of $S_\mu(t)$, mutual-correlation coefficients $\phi_1(v)$ and $\phi_2(v)$ of the input noise and the two detected noises $S_{n1}$, $S_{n2}$ are given by the following equations (15) and (16):

$$\phi_1(\nu) = \sum_{t=1}^{N} U(t)S_{n1}(t+\nu) = \sum_{t=1}^{N} \{S_\mu(t) - aS_{n2}(t-\tau)\}S_{n1}(t+\nu) = \sum_{t=1}^{N} S_\mu(t)S_{n1}(t+\nu) - \sum_{t=1}^{N} aS_{n2}(t-\tau)\cdot S_{n1}(t+\nu) = \phi_{n1}(\nu) - a\phi_{12}(\tau+\nu) \quad (15)$$

In the equation (15), $\phi_{n1}(v)$ denotes a mutual-correlation coefficient of $S_\mu(t)$ and $S_{n1}(t)$, and $\phi_{12}(\tau+v)$ denotes a mutual-correlation coefficient of $S_{n1}(t)$ and $S_{n2}(t)$. Similarly, $\phi_2(v)$ is given by the equation (16):

$$\phi_2(\nu) = \sum_{t=1}^{N} U(t)S_{n2}(t+\nu) = \sum_{t=1}^{N} \{S_\mu(t) - aS_{n2}(t-\tau)\}S_{n2}(t+\nu) = \sum_{t=1}^{N} S_\mu(t)S_{n2}(t+\nu) - \sum_{t=1}^{N} aS_{n2}(t-\tau)\cdot S_{n2}(t+\nu) = \phi_{n2}(\nu) - aR_{n2}(\tau+\nu) \quad (16)$$

In the equation (16), $\phi_{n2}(v)$ denotes a mutual-correlation coefficient of $S_\mu(t)$ and $S_{n2}(t)$, and $R_{n2}(\tau+v)$ denotes an auto-correlation coefficient of $S_{n2}(t)$.

What is meant by $\phi_1(v)$ and $\phi_2(v)$ of the equations (15) and (16) is that the mutual-correlation coefficient of $S_\mu(t)$ and $S_{n1}(t)$ should be corrected by the mutual-correlation coefficient of $S_{n1}(t)$ and $S_{n2}(t)$, and that the mutual-correlation coefficient of $S_\mu(t)$ and $S_{n2}(t)$ can be corrected by the auto-correlation coefficient of $S_{n2}(t)$.

The above-mentioned contents include the case where there are two noise sources. The same idea can be applied even to a case where there are a plurality of noise sources as described below.

It can be considered that the filter coefficient that has been determined in advance of the equivalent noise-producing filter for the second noise source, is a first and a sole filter coefficient which minimizes the noise-canceled residual waveform U(t). From a different point of view, this is a filter coefficient of an equivalent noise-producing filter for the noise output of a noise receiver that exhibits a maximum correlation with respect to the noise output of the sound receiver that traps voice signals. The maximum correlation is denoted by $\phi_{1P}$ where a postscript 1 denotes an output noise of the voice signal receiver and a postscript P denotes an output noise of the noise receiver that exhibits the maximum correlation.

When U(t) is regarded to be an input, $\phi_{1P}$ can be corrected by d and $R_P$ *as illustrated in conjunction with the equation* (16), and $\phi_{1j}(j \neq P)$ other than the maximum correlation can be corrected by $\phi_{Pj}$. If now $\phi_{1P}$ is $\phi_{13}$, then $\phi_{13}$ can be corrected by a and $R_3$ for the next U(t), and $\phi_{12}$ can be corrected by a and $\phi_{32}$ as meant by the contents of the equations (15) and (16). In this case, the coefficient a can be found from the aforementioned equation (12). Namely, the coefficient a is that of a filter for a noise which produces a maximum correlation, and is obtained by retrieving a maximum mutual correlation coefficient $\phi_{1P}$ and normalizing it with the self-correlation coefficient $R_P(o)$.

In effect, a maximum mutual-correlation coefficient is corrected by an auto-correlation coefficient sequence of noise that produces the maximum value, and the sequence of mutual-correlation coefficients that are not the maximum value is corrected by the consequence of mutual-correlation coefficients corresponding to noise that exhibit the maximum value. The above processing is cyclically repeated until the level of the noise-canceled residual waves becomes smaller than a predetermined level, thereby to estimate the filter coefficients. Thus, the filter coefficients can be estimated while greatly reducing the amounts of operation.

In the cyclical processing, the coefficient of the same tap of the equivalent noise-producing filter may often be subjected to the estimation processing a plural number of times. This, however, presents no problem, and the plural number of the coefficients thus obtained should simply be added up together.

Figure 4:
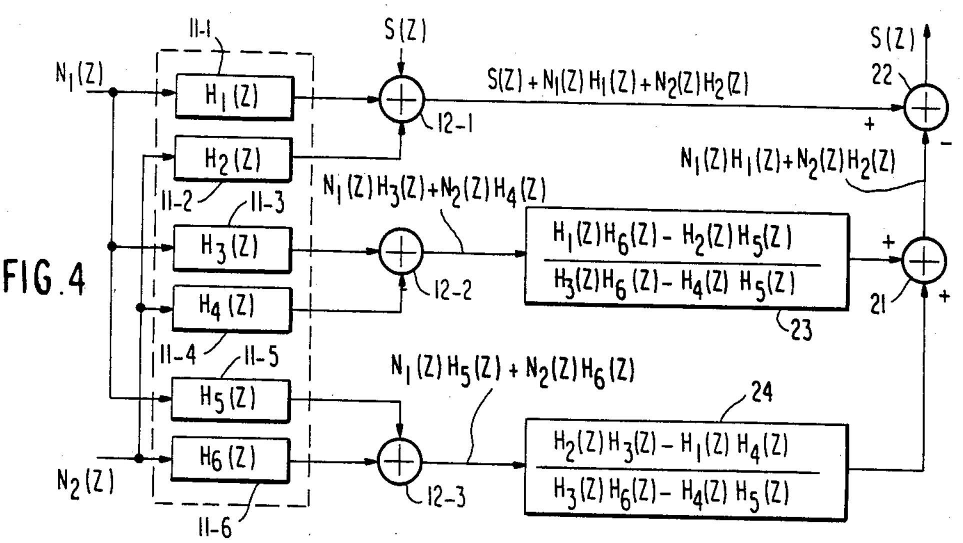
FIG. 4 is a diagram illustrating the estimation of transfer functions of the equivalent noise-producing filters according to the embodiments of FIG. 1.

FIG. 4 is a diagram for explaining the estimation of transfer functions of the equivalent noise-producing filters in the embodiment of FIG. 1.

The equivalent noise-producing filters 23 and 24 are constituted as transversal filters having transfer functions given by the equations (17) and (18). In the case of the equivalent noise-producing filters of FIG. 3, the filter coefficients are estimated based upon a prerequisite that the transfer functions $H_1(Z)$ to $H_6(Z)$ of noise transmission paths are all determined. In the case of this embodiment, however, the filter coefficients of the equivalent noise-producing filters 23 and 24 are determined by retrieving a maximum mutual-correlation coefficient of noise output during silence of the sound receiver which chiefly receives voice signals and noise outputs of a plurality of sound receivers which chiefly receive noises generated from a plurality of noise sources, by so setting the filter coefficient of a transversal filter that it exhibits an impulse response which equivalently expresses the maximum mutual-correlation coefficient, by successively correcting the maximum mutual-correlation coefficient and other mutual-correlation coefficients by the above-mentioned means, and cyclically repeating the processing a required number of times.

Transfer functions of the equivalent noise-producing filters 23 and 24 are given by the following equations (17) and (18), $$\frac{H_1(Z)H_6(Z) - H_2(Z)H_5(Z)}{H_3(Z)H_6(Z) - H_4(Z)H_5(Z)} \tag{17}$$

$$\frac{H_2(Z)H_3(Z) - H_1(Z)H_4(Z)}{H_3(Z)H_6(Z) - H_4(Z)H_5(Z)} \tag{18}$$

If outputs of the adders 12-2 and 12-3 are added up together through the adder 21 via transfer functions given by the equations (17) and (18), there is obtained an output $N_1(Z)H_1(Z)+N_2(Z)H_2(Z)$ which is free from the effect caused by the interference among the noises. If this output is added with its signs reversed to the output of the adder 12-1 through the adder 22, the noise component can be canceled The principal object of the embodiment of FIG. 1 is to set the coefficient of the transversal filter having such a transfer function by the above-mentioned correction estimated means.

Reverting to FIG. 1, the embodiment will be described below.

The sound receiver 1-1 chiefly receives voice signals together with undesired noise.

The noise receivers 1-2 to 1-P chiefly trap noses generating by noise sources of a number (P-1).

The delay circuit compensates the time differences of noise inputs that stem from the arrangements of the sound receiver 1-1 and the sound receivers 1-2 to 1-P. Therefore, the delay circuit 2 has been set in advance by taking into consideration the arrangement and the mode of operation.

The silence detector 3 detects the silent condition of voice signals input to the sound receiver 1-1, and sends the data to the coefficient determining unit 6.

The mutual-correlation coefficient calculators 4-12, 4-13, - - - , 4-1P calculate mutual-correlation coefficient sequences $\phi_{12}$, $\phi_{13}$, - - - , $\phi_{1P}$ between the noise output of the sound receiver 1-1 during silence and each of the noise outputs of the sound receivers 1-2 to 1-P.

The auto-correlation coefficient calculators 5-2, - - - , 5-P calculate auto-correlation coefficient sequences $R_2$, $R_3$, - - - , $R_P$ of noise outputs of the respective sound receivers 1-2 to 1-P. The mutual-correlation coefficient sequences $\phi_{1j}$ (j=2, 3, - - - , P) and the auto-correlation coefficient sequences $R_k$ (k=2, 3, - - - , P) are all supplied to the coefficient determining unit 6.

The coefficient determining unit 6 retrieves a maximum value related to the thus supplied mutual-correlation coefficient sequences $\phi_{1j}$ between the noise output of the sound receiver 1-1 during silence and each of the noise outputs of the second receivers 1-2 to 1-P. Among these sequences $\phi_{1j}$, it is now presumed that a maximum value $\phi_{1j}$, it is now presumed that a maximum value $\phi_{1q}$ is retrieved with j=q and having a delay time T.

Next, a filter coefficient of the equivalent noise-producing filter in the form of a transversal filter having an impulse response hq(T) is determined to be $\phi_{1q}(T)/R_q(O)$. If q is 3, it means that the filter coefficient which determines the impulse response $h_3(t)$ of the equivalent noise-producing filter 7-3 is calculated to be $\phi_{13}(T)/R_3(O)$. This operation is carried out by using the aforementioned equation (12) to determine the coefficient a in compliance with the equation (12). The coefficient a obtained by $\phi_{13}(T)$ being normalized with $R_3(O)$ is offered as an optimum coefficient of a tap T of the equivalent noise-producing filter 7-3. The noise output of the sound receiver 1-3 is added to the adder 8-1 with its sign being inverted via equivalent noise-producing filter 7-3, and adders 8-3 and 8-2, thereby to minimize the noise which offers a maximum mutual-correlation coefficient sequence. Further, the remaining noise component is sent to the coefficient determining unit 6 as a noise-canceled residual waveform.

The coefficient determining unit 6 retrieves a maximum value again for the noise-canceling residual waveforms that are input to repeat the same processing cyclically until the electric power of the noise-canceled residual waveforms becomes smaller than a predetermined level. The adders 8-2 to 8-P add up the outputs of the equivalent noise-producing filters 7-2 to 7-P, and second them to the adder 8-1.

In the foregoing were described the processing contents according to the first embodiment.

A second embodiment is to further increase the efficiency of the process for estimating the filter coefficients of the first embodiment. The second embodiment is constituted by adding mutual-correlation coefficient adders 4-23 to 4-2P, 4-34 to 4-3P, - - - indicated by dotted lines to the aforementioned first embodiment.

The mutual-correlation coefficient calculators find mutal-correlation coefficients $\phi_{ij}$ (i=2, 3, - - - , (P-1), j=3, 4, - - - , P) without superposition in a way that the mutual-correlation coefficient calculators 4-23 to 4-2P find mutual-correlation coefficients between the output of the sound receiver 1-2 and each of the outputs of the sound receivers 1-3 to 1-P, and the mutual-correlation coefficient calculators 4-34 to 4-3P find mutal-correlation coefficients between the output of the sound receiver 1-3 and each of the outputs of the sound receivers 1-2 to 1-P (except 1-3).

The coefficient determining unit 6 retrieves a maximum value $\phi_{1q}$ out of the sequence $\phi_{1j}$, and determines the filter coefficient at the tap T of the equivalent noise-producing filter that has impulse response hq(T) to be $\phi_{1q}$/Rq(O).

The mutual-correlation coefficient $\phi_{1q}$ is corrected by Rq, and $\phi_{1j}$(j≠q) other than $\phi_{1q}$ are all corrected by $\phi_{qj}$ among $\phi_{ij}$. If now Q is 3, $\phi_{13}$ is corrected by $R_3$, and $\phi_{ij}$ other than $\phi_{13}$ are all corrected by $\phi_{3j}$ among $\phi_{ij}$. The above correction processing is based upon the contents explained in conjunction with the equations (14) to (16). The feature of the second embodiment resides in that $\phi_{1j}$(j≠q) are generally corrected by $\phi_{qj}$ among $\phi_{ij}$, and the coefficient estimating process starting from the retrieval of a maximum value is cyclically performed by utilizing $\phi_{12}$, $\phi_{13}$, - - - , $\phi_{1P}$ that are corrected, until the noise-canceled residual waveform becomes smaller than a predetermined level. By adapting this method, the coefficient estimating process of the first embodiment can be further simplified. The coefficients are estimated by utilizing the processing idea of FIG. 4 in order to greatly reduce the amount of operation.

What is claimed is:

1. A noise canceling system comprising:

a voice receiver means for primarily receiving an input voice signal and converting it into an electric voice output signal;

a plurality of noise receiving means, each for primarily receiving noise generated from a corresponding noise source and converting the noise into an electrical noise output signal;

first calculator means for calculating auto-correlation coefficients of the respective outputs of said noise receiver means;

second calculator means for calculating first mutual-correlation coefficients between the output of said voice receiver means, when a voice signal is not inputted, and the respective outputs of said noise receiver means;

a plurality of first filter means, each having an input coupled to the output of a corresponding noise receiver means and having a frequency transmission characteristic of a path from a corresponding noise source to said voice receiver means, for producing equivalent noise output signals;

adder means for summing the outputs of said plurality of said first filter means and providing an output;

subtracter means for outputting the difference between the outputs of said voice receiver means and said adder means; and coefficient determination means, responsive to the outputs of said first calculator means, second calculator means and subtracter means, and actuable to determine filter coefficients of said plurality of said first filter means.

2. A noise canceling system according to claim 1, further comprising a silence detector means for detecting a condition where no voice signal is inputted into said voice receiver means and for actuating said coefficient determinator means.

3. A noise canceling system according to claim 1, further comprising delay means for delaying the output signal from said voice receiver means for a predetermined time.

4. A noise canceling system according to claim 1, wherein said coefficient determinator means comprises first means for determining the filter coefficients based upon a first maximum value of the mutual-correlation coefficients and upon the auto-correlation coefficients calculated by said first and second calculator means, respectively.

5. A noise canceling system according to claim 4, wherein said coefficient determinator means further comprises: second means for determining second mutual-correlation coefficients between the outputs of said noise receiver means; third means for correcting said first maximum value by the auto-correlation coefficient of the output of a corresponding noise receiver means which output produces said first maximum value; and fourth means for correcting the first mutual correlation coefficients, other than having the first maximum value, by the second mutual-correlation coefficients.

6. A noise canceling system comprising:

first receiver means for primarily receiving an input voice signal and converting it into an electric voice signal;

second through p-th receiver means each receiving a corresponding noise from (P-1) noise sources and converting it into an electrical noise signal;

delay means for compensating the input time differences between said first and second receiver means;

silence detector means for detecting a silence condition where no input voice signal exists;

mutual-correlation coefficient calculator means for calculating mutual coefficients between the output of said first receiver means, when said silence detector means detects the silence state, and the respective outputs of said second through p-th receiver means;

auto-correlation coefficient calculator means for calculating auto-correlation coefficients of the respective outputs of said second through p-th receiver means;

(P-1) filter means, respectively coupled to said second through p-th receiver means and having frequency transmission characteristics of paths from the respective noise sources to said first receiver means, for producing equivalent noise output signals;

adder means for adding the outputs of said filter means and providing an output;

subtracter means for outputting the difference between the outputs of said first receiver means and said adder means; and coefficient determinator means, coupled to said auto-correlation coefficient calculator means, mutual-correlation coefficient calculator means and subtracter means, for determining appropriate filter coefficients of said filter means.

7. A noise canceling system according to claim 6, wherein said coefficient determinator means includes means for determining the filter coefficients based upon a maximum value of the mutual-correlation coefficient and upon the auto-correlation coefficients.

8. A noise canceling system comprising:

voice receiver means for primarily receiving voice;

a first filter having a first frequency transmission characteristic $H_1$, of a path from a first noise source to said voice receiver means;

a second filter having a second frequency transmission characteristic $H_2$ of a path from a second noise source to said voice receiver means;

a third filter means having a third frequency transmission characteristic $H_3$ of a path from a third noise source to a first receiver which primarily receives first noise from said first noise source;

a fourth filter having a fourth frequency transmission characteristic $H_4$ of a path from the second noise source to said first receiver;

a fifth filter having a fifth frequency transmission characteristic $H_5$ of a path from the first noise source to a second receiver which primarily receives said second noise;

a sixth filter having a sixth frequency transmission characteristic $H_6$ of a path from said second noise source to said second receiver;

first summer means for summing the outputs of said first filter, second filter and voice receiver means;

second summer means for summing the outputs of said third and fourth filters;

third summer means for summing the outputs of said fifth and sixth filters;

seventh and eighth filters, coupled to said second summer, having the frequency characteristics of said fifth and sixth filters, respectively;

ninth and tenth filters, coupled to said third summer, having the frequency characteristics of said fourth and third filter, respectively;

first subtracter means for subtracting the output of said ninth filter from the output of said eighth filter;

second subtracter means for subtracting the output of said seventh filter from the output of said tenth filter;

an eleventh filter, coupled to said first subtracter, having the following frequency transmission characteristics:

$$\frac{H_1}{H_3 \cdot H_6 - H_4 \cdot H_5}$$

a twelfth filter, coupled to said second subtracter means, having the following frequency transmission characteristics:

$$\frac{H_2}{H_3 \cdot H_6 - H_4 \cdot H_5}$$

third subtracter means for subtracting the output of said eleventh and twelfth filters from the output of said first subtracter means and filter coefficient determinator means responsive to at least the output of said third subtracter means for determining the filter coefficients of all of said filters so as to minimize the output of said third subtracter means.

9. A noise canceling system according to claim 8, wherein said filter coefficient determinator means includes first calculator means for calculating auto-correlation coefficients of the respective outputs of the first and second receivers, second calculator means for calculating first mutual-correlation coefficients between the output of said voice receiver and the outputs of said first and second receivers, and third calculator means for calculating filter coefficients based upon the auto-correlation coefficients and the first mutual-correlation coefficients.

10. A noise canceling system according to claim 8, wherein said filter coefficient determinator means includes first calculator means for calculating auto-correlation coefficients of the respective outputs of the first and second receivers, second calculator means for calculating first mutual-correlation coefficients between the outputs of said first and second receivers, third calculator means for calculating second mutual correlation coefficients between the output of said second receiver and a subtraction result obtained by subtracting from said first receiver output a filtered output of said second receiver output, and fourth calculator means for calculating the filter coefficients based upon the first and second mutual-correlation coefficients and the auto-correlation coefficients.

* * * * *